(12) United States Patent
Mack et al.

(10) Patent No.: US 8,466,794 B2
(45) Date of Patent: Jun. 18, 2013

(54) HEAD IMPACT EVENT REPORTING SYSTEM

(75) Inventors: Christoph Mack, Seattle, WA (US);
Marina Kuznetsova, Brier, WA (US);
Scott Votaw, Brier, WA (US)

(73) Assignee: X2 Biosystems, Inc., Seattle, WA (US)

( * ) Notice: Subject to any disclaimer, the term of this patent is extended or adjusted under 35 U.S.C. 154(b) by 361 days.

(21) Appl. No.: 13/009,663

(22) Filed: Jan. 19, 2011

(65) Prior Publication Data
US 2011/0181419 A1    Jul. 28, 2011

Related U.S. Application Data

(60) Provisional application No. 61/336,429, filed on Jan. 22, 2010, provisional application No. 61/409,906, filed on Nov. 3, 2010.

(51) Int. Cl.
*G08B 23/00* (2006.01)
*G01L 1/00* (2006.01)
*G01D 21/00* (2006.01)
*A61B 5/00* (2006.01)

(52) U.S. Cl.
USPC .......................... 340/573.1; 702/41; 73/866.3

(58) Field of Classification Search
None
See application file for complete search history.

(56) References Cited

U.S. PATENT DOCUMENTS

| 4,883,271 A | 11/1989 | French |
| 5,539,935 A | 7/1996 | Rush, III |
| 5,621,922 A | 4/1997 | Rush, III |
| 5,723,786 A | 3/1998 | Klapman |
| 6,611,782 B1 | 8/2003 | Wooster et al. |
| 6,826,509 B2 | 11/2004 | Crisco, III et al. |
| 6,925,851 B2 | 8/2005 | Reinbold et al. |
| 6,941,952 B1 | 9/2005 | Rush, III |
| 2005/0177929 A1 | 8/2005 | Greenwald et al. |
| 2012/0143526 A1 | 6/2012 | Benzel et al. |
| 2012/0147009 A1 | 6/2012 | Benzel et al. |
| 2012/0150453 A1 | 6/2012 | Benzel et al. |
| 2012/0220893 A1 | 8/2012 | Benzel et al. |

OTHER PUBLICATIONS

"Hall Ryan Laboratories Inc.," Wireless Biosensors for Industrial and Sports Safety, Hall Ryan Laboratories Inc., http://hallryan.com/products.html, pp. 4, 2008.
Higgins, et al., "Measurement of Impact Acceleration: Mouthpiece Accelerometer Versus Helmet Accelerometer," Journal of Athletic Training, 2007;42(1):5-10, www.journalofathletictraining.org.

*Primary Examiner* — Brian Zimmerman
*Assistant Examiner* — Omeed Alizada
(74) *Attorney, Agent, or Firm* — Lowe Graham Jones PLLC

(57) ABSTRACT

Head impact event evaluation systems and methods. A system and computer implemented method for event detection includes collecting sensor data transmitted from one or more sensor devices being attached to one or more users. The sensors transmit data when an event results in sensor data above a threshold value. At least one force is determined based on the collected sensor data. At least one force vector is determined based on a location of one or more sensors associated with the sensor devices and the determined at least one of the linear or rotational force. At least a portion of a human form is displayed with the determined force vector based on the determined at least on force vector on a display.

17 Claims, 12 Drawing Sheets

HEAD IMPACT EVENT REPORTING SYSTEM

PRIORITY CLAIM

This application claims the benefit of U.S. Provisional Application Ser. No. 61/336,429 filed Jan. 22, 2010 and U.S. Provisional Application Ser. No. 61/409,906 filed Nov. 3, 2010, the contents of both are hereby incorporated by reference.

BACKGROUND OF THE INVENTION

Participation in athletic activities is increasing at all age levels. All participants may be potentially exposed to physical harm as a result of such participation. Physical harm is more likely to occur in athletic events where collisions between participants frequently occur (e.g., football, field hockey, lacrosse, ice hockey, soccer and the like). In connection with sports such as football, hockey and lacrosse where deliberate collisions between participants occur, the potential for physical harm and/or injury is greatly enhanced. Approximately 300,000 athletes incur concussions in the United States each year. This may be a conservative estimate because many minor head injuries go unreported. Although most concussions occur in high-impact sports, athletes in low-impact sports are not immune to mild traumatic brain injury. Head injuries are caused by positive and negative acceleration forces experienced by the brain and may result from linear or rotational accelerations (or both). Both linear and rotational accelerations are likely to be encountered by the head at impact, damaging neural and vascular elements of the brain.

At the school level, school authorities have become sensitive to the risk of injury to which student participants are exposed, as well as to the liability of the school system when injury results. Greater emphasis is being placed on proper training and instruction to limit potential injuries. Some players engage in reckless behavior on the athletic field or do not appreciate the dangers to which they and others are subject by certain types of impacts experienced in these athletic endeavors. Unfortunately, the use of mouth guards and helmets does not prevent all injuries. One particularly troublesome problem is when a student athlete experiences a head injury, such as a concussion, of undetermined severity even when wearing protective headgear. Physicians, trainers, and coaches utilize standard neurological examinations and cognitive questioning to determine the relative severity of the impact and its effect on the athlete. Return to play decisions can be strongly influenced by parents and coaches who want a star player back on the field.

The same problem arises in professional sports where the stakes are much higher for a team, where such a team loses a valuable player due to the possibility of a severe head injury. Recent medical data suggests that lateral and rotational forces applied to the head and neck area (for example, flexion/extension, lateral flexion, and axial rotation) are more responsible for axonal nerve damage than previously thought. Previous medical research had indicated that axially directed forces (such as spinal compression forces) were primarily responsible for such injuries.

Identifying the magnitude of acceleration that causes brain injury may assist in prevention, diagnosis, and return-to-play decisions. Most field measurements assess the acceleration experienced by the player with accelerometers attached to the helmet. The following show some attempts for measuring the impacts to the skull and brain while the player is participating in a sporting activity. U.S. Pat. No. 5,539,935, entitled "Sports Helmet," issued on Jul. 30, 1996 and U.S. Pat. No. 5,621,922, entitled "Sports Helmet Capable of Sensing Linear and Rotational Forces," issued on Apr. 22, 1997 are examples of some of those attempts. Both patents relate to impact sensors for linear and rotational forces in a football helmet. These devices test the impact to the skull of a player. If an athlete suffers a concussion, for example, it will be possible to determine if the relative magnitude of an impact is dangerously high relative to a threshold to which each sensing device is adjusted, taking into consideration the size and weight of the player.

Another attempt performs testing impact acceleration to the head with an intraoral device which provides acceleration information of the brain in various sports. Other attempts have been made, however all these attempts can be costly to implement and fail to provide full historical medical information to coaches, trainers and medical professionals in real-time for dozens of players at a time on one or more adjacent fields.

SUMMARY OF THE INVENTION

The present invention provides a wirelessly linked sports impact sensing and reporting system. The system mainly includes one or more player electronics modules, a sideline module, and a remotely served and remotely accessible recording database module. In one aspect of the invention, the player module is housed independently within the volume of a set of an otherwise standard mouth guard and chin strap assembly, the sideline module is housed within the structure of an otherwise standard clipboard, and the database module is accessible via a network, e.g., public or private Internet.

In one version of the invention, the player module includes a plurality of sensors capable of detecting impact events in multiple axes, a battery, a data memory storage device, a microprocessor and a LED status indicator array. Each player module includes an RF transducer module and an antenna system, capable of establishing a wireless mesh network for reporting the data associated with an impact to the player. A zinc-air primary cell battery is used with the present player module device, but may be substituted by use of a lithium-polymer rechargeable battery or similar.

In another version of the invention, the sideline module includes a radio system capable of acting as a node on the wireless network and receiving signals from any of the player modules participating on the wireless mesh network in real-time. The sideline module also includes a battery, a data memory storage device, a microprocessor and a display capable of indicating impact information per player on the wireless mesh network, severity of impact, and recommended action in near real-time. The sideline module also includes a loudspeaker capable of generating audible alert tones to attract a coach's attention to incoming information in real-time. A zinc-air primary cell battery is used with the present player module device, but may be substituted by use of a lithium-polymer rechargeable battery or similar.

In still another version of the invention, the database module includes a database of players and associated impact data arrangeable by name, team, date, severity of impact, frequency of impact, and many other parameters. The database module is so constructed to be accessible via the public or private data network and is configured to provide various degrees of access to its information contents. Access accounts may be configured according to individual, team, division, league, physician, and administrator levels. Each account will be granted access to the appropriate set of data only, and password protection will ensure dissemination of data only to authorized parties.

In yet an additional version of the invention, an example system includes a mouth guard having a proximity sensor, an accelerometer, a gyroscope, a processor in signal communication with the accelerometer and gyroscope, a memory in data communication with the processor, a transmitter in signal communication with the processor, and a battery that provides power to the processor, the memory, the accelerometer, and the gyroscope. The processor is configured to allow power from a battery to flow to the accelerometer and gyroscope when the proximity sensor detects that the mouth guard has been inserted into a mouth. The processor is also configured to instruct the transmitter to transmit a signal if an acceleration above a predefined first threshold is sensed and to continue transmitting if an acceleration above a predefined second threshold is sensed before a first time period is complete.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
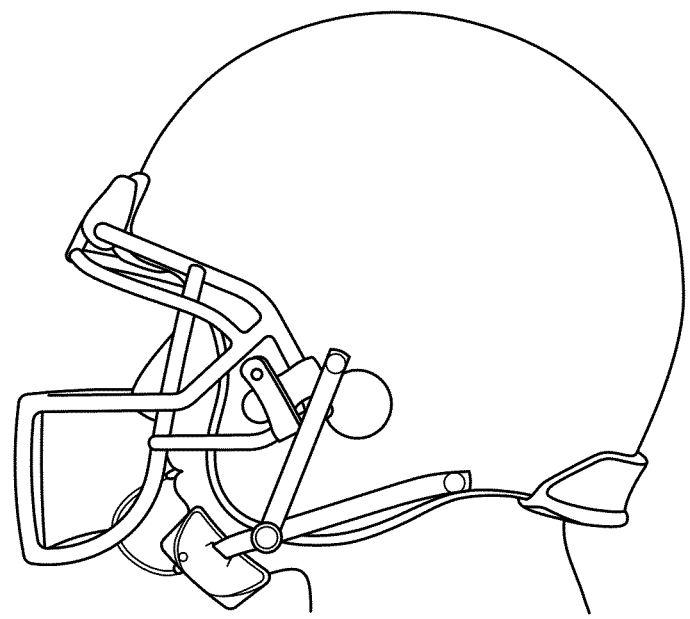
FIG. 1 is a drawing showing an example of the invention in context of a football player's head in profile, while wearing a football helmet and the sensor-enabled mouth guard and chin strap set, i.e. the player module.
Figure 2:
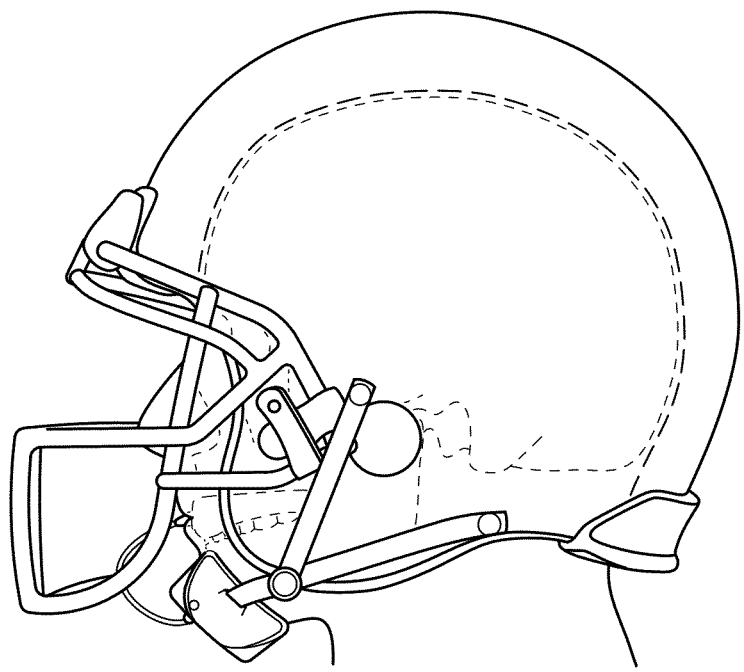
FIG. 2 is a drawing showing the player module in context of its positioning as worn within a human head.

A preferred version of the present invention is a system for the detection, measurement, characterization, transmission, and/or reporting of events causing impact forces to be experienced by players, for example football players. Thus, as shown in FIGS. 1 and 2, a preferred system is configured for use with a mouth guard in a situation in which a player also uses a chinstrap and a helmet. In other examples, various sensors may be incorporated into other housings such as headbands, goggles, or other headgear. The system conveys to an authority figure, preferably a coach or trainer, useful information about the identity of the impacted player, the severity of the impact, and suggested actions for evaluating the condition of the player and for making decisions about the players subsequent status vis-à-vis readiness to return to play or referral to a physician's care.

An example of the player module includes an arrangement of a plurality of low-cost, distributed sensors arranged between the inside surface of the player shell and the bottom surface of a padding elements that provide fit and cushioning to the player's head. These sensors may alternatively be positioned intermediately within the padding element, either at the interface of two laminated elements, or by encapsulation directly within the mass of the padding element. The sensors may also be situated within cavities of the player or in the spaces between padding elements. For example, these sensors may be MEMS type impact sensors, MEMS accelerometers, miniature weighted cantilevers fitted with miniature strain-gauge elements, piezoelectric membranes, or Force-Sensitive-Resistors (FSR).

Figure 3:
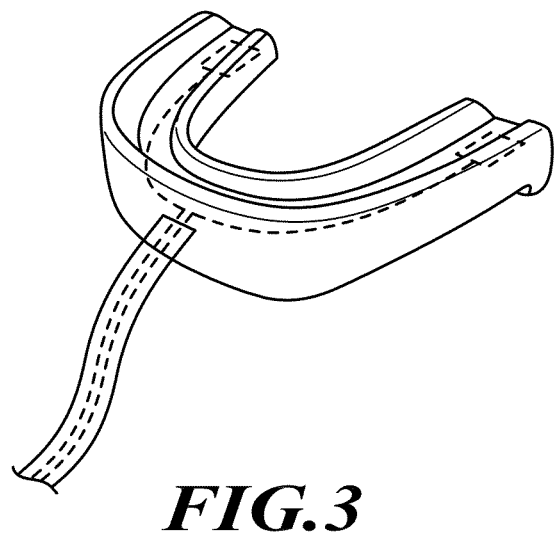
FIG. 3 is a drawing in isometric view showing an example mouth guard element of the player module and indicating the positioning of embedded sensor elements and conductors.
Figure 4:
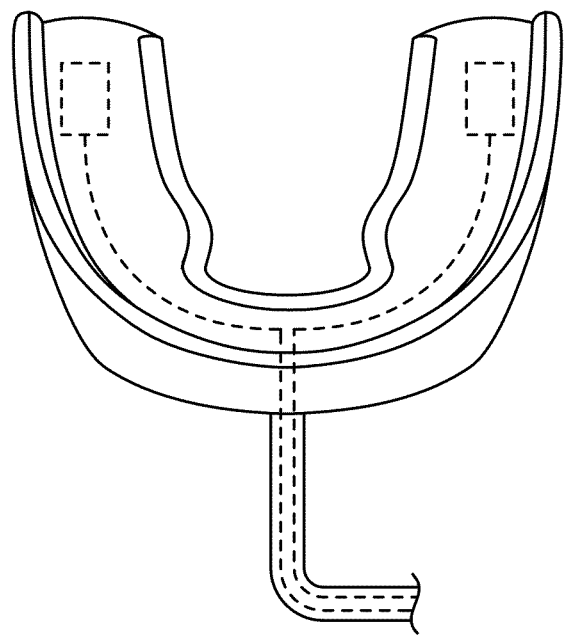
FIG. 4 is a drawing in plan view showing the example mouth guard element of the player module and indicating the positioning of embedded sensor elements and conductors.

In one example, the sensors are incorporated into a sensor unit that is configured as a mouth guard. Thus, as shown in FIGS. 3 and 4, various sensors may be encapsulated into the material formed as a mouth guard. In the illustrated version, sensors are shown being positioned at a lower surface of the mouth guard, beneath the channel formed to receive a user's teeth. As also illustrated, the exemplary mouth guard of FIGS. 3 and 4 includes a wire or tether, preferably encapsulated in a protective covering, extending from a forward portion of the mouth guard in order to send data to a base unit or other device. In other versions, as described below, the mouth guard includes an antenna for wirelessly transmitting the data to an intermediate module or directly to a sideline receiving unit.

Figure 5:
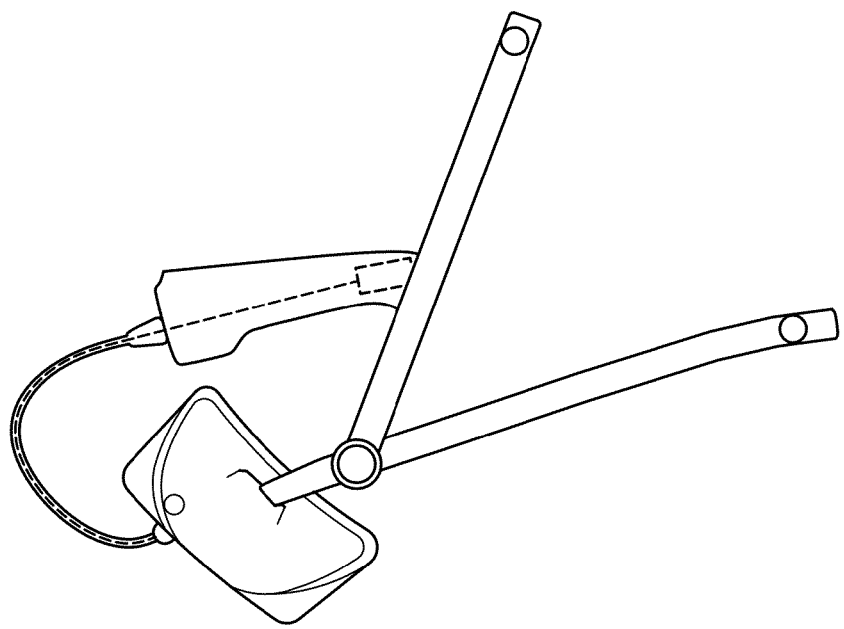
FIG. 5 is a drawing showing a side view of an example player module, including the mouth guard element and chinstrap element, and showing the relationship and connection between the two.
Figure 6:
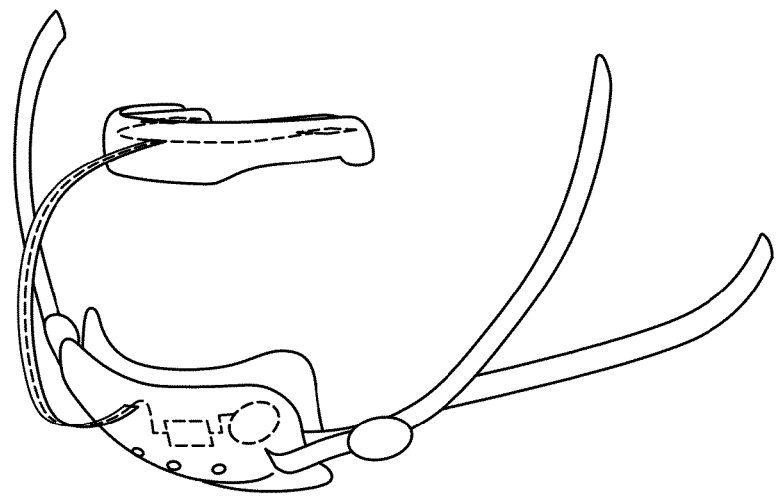
FIG. 6 is a drawing in isometric view showing the player module, including mouth guard and chinstrap elements.

The sensors employed in the player module are connected electronically by means of wires or printed flex circuitry to an electronics pod or other similar means, in some versions situated within a primary shell of the player, and within the space available between two or more padding elements. As illustrated in FIGS. 5 and 6, in some versions the mouth guard sensors are communicatively coupled to a receiving unit contained within a chin strap or other such component external to the mouth. The chin strap includes electronic components to transmit the data received from the mouth guard and then pass it along to a sideline receiving unit. Most preferably the data is passed along in real time, although in some versions the data is stored in a memory and downloaded at a later time.

The electronics pod (whether in the helmet, the mouth guard, the chin strap, or another location) collects, processes, evaluates, and if appropriate, transmits data pertaining to an impact event via radio to one or more other participant nodes of the wireless network to which the player module belongs. The electronics pod contains electronic circuitry having components such as a microprocessor, flash memory, radio module, antenna, and status display LEDs. In the circuit's memory resides a database lookup table for evaluation of sensor data and comparison to combinations of impact levels that represent suspicious likelihood of Mild Traumatic Brain Injury (MTBI) or concussion. The electronics pod is also configured to monitor, evaluate, and/or display system status information such as link to network, battery charge status, and proper system functioning.

Figure 7:
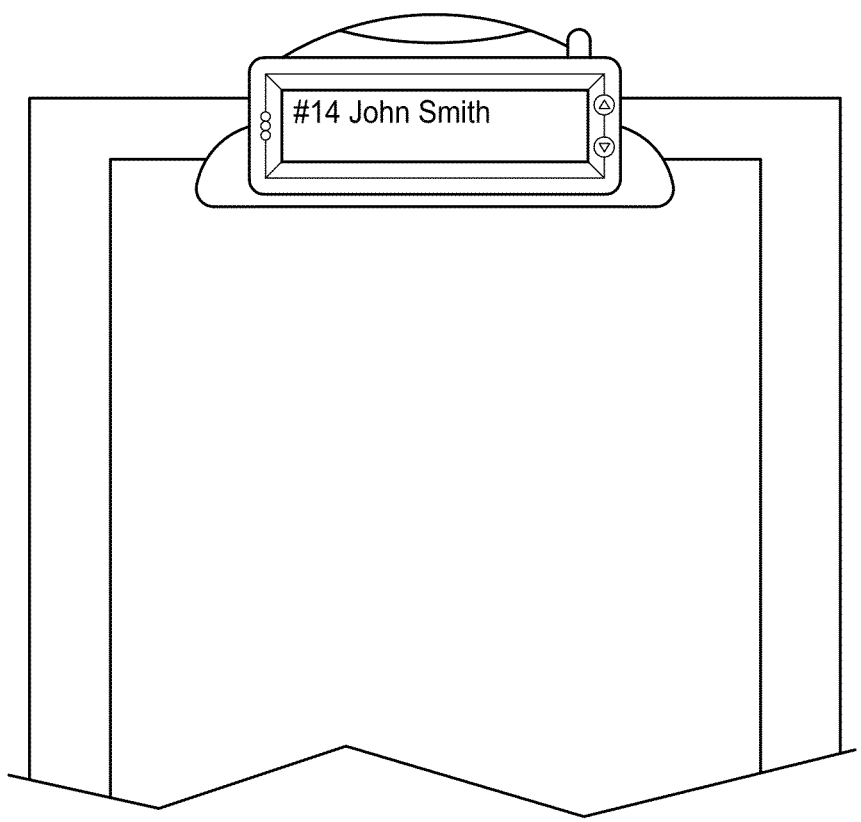
FIG. 7 is a drawing showing a portion of an example sideline module embodied as a clipboard, with a display and input buttons in the uppermost region.

An example sideline module is an electronic data gathering and display device incorporated into a portable enclosure that is easy for a coach, trainer, or other such game official to carry, consult, and interact with during the activities of the practice or game. In one embodiment, the sideline module is embedded into the topmost section of a clipboard, for example as illustrated in FIG. 7. Since the majority of coaches and trainers need to carry clipboards anyway, this is perceived as the most natural and least obtrusive way to provide impact information. However, many other configurations of the sideline module are possible, including building it into a wristband, a stopwatch-style fob with a neck lanyard, a device similar to a mobile phone or pager, etc. The sideline module may be in the form of any electronic receiving device, including laptop computers, mobile phones, or any other such device configurable to receive wireless information. Moreover, the sideline module is described as receiving information directly from the sensor unit, although in some versions of the invention the sensor module may pass its data to an intermediate server or other device which then forwards the information to the sideline module.

The sideline module includes electronic components arranged into a circuit that allows for participation in the wireless mesh network established by a set of player modules, and specifically for the receipt of data transmissions from the player modules, and subsequently the display of impact event information on a visual display in real-time. The sideline module also produces audible and vibratory alert signals to call attention to the arrival of new data messages in real-time, which are disabled by manual conscious intervention of the coach or trainer, indicating acknowledgement of receipt of impact event data.

In one embodiment, the sideline module performs the classification of incoming impact data into one of three categories, indicating differing levels of concern and differing levels of urgency of response. The system employs a "GREEN LIGHT" "YELLOW LIGHT" and "RED LIGHT" system, in which a GREEN LIGHT status indicates the absence of significant impact events for a given player, a YELLOW LIGHT indicates the need for immediate sideline evaluation of the player, and RED LIGHT indicates a severe enough impact that the player be removed from play and referred to a physician immediately.

Upon registering a YELLOW LIGHT impact event, and upon subsequent acknowledgement of receipt of the message by the coach or trainer, the sideline module, in one embodiment, leads the coach or trainer through a simple protocol for evaluation of the player's condition. Through answering a series of simple Yes or No questions, the sideline module guides the coach or trainer to a limited number of possible suggested actions. These potential outcomes could include immediate referral to a physician for further examination, or a period of bench time observation followed by a secondary guided evaluation before allowing the player to return to play.

In accordance with the various versions of the invention, the system may alternatively employ a two-level score, such as only red and green but no yellow. In an example of the invention, an experienced impact of less than 50 g would not require an assessment or other evaluation, while an impact above 50 g would at least require an assessment.

In one embodiment, a durable record of data transactions is received in real-time and is kept independently of the sideline module or modules. Such a database provides players, parents, coaches, trainers, administrators and other stakeholders access to a record of what impact event information was conveyed, when, to whom and about which player. The sideline module is equipped with a wide area network radio module for transmission of a record of all data transactions on the system with time stamp and a record of the actions by coaches and content of player evaluations. A standard 1 way or 2 way pager system is used, which has the benefit of being inexpensive and nearly ubiquitous in availability throughout much of the world. Alternatives to pager radio systems are cellular radios of various kinds and other wide area network wireless connections. The knowledge that this information will be available to stakeholders provides accountability to all stakeholders in the health and well being of the player.

In one embodiment, the database is populated by an automatic interface to the wide area radio network accessed by the sideline network, and is accessible to stakeholders by means of internet based applications, equipped with password protected hierarchical account structures. The system provides parents the ability to log on to their account and review the totality of impact event data and the record of coach responses associated with their player.

Each player module at the start of each season maps its unique identifier code to a particular player's name and number. It is possible that during the course of events players might accidentally wear the wrong player number and potentially cause confusion by users of the system. It is for this reason that each player module has, in one embodiment, a visual indicator array of LEDs, which will repeatedly flash a visible signal in case of transmission of an impact event of concern. A yellow light flashes to indicate the transmission of a YELLOW LIGHT event, and a red light flashes to indicate the transmission of a RED LIGHT event. When the player is called to the sidelines for evaluation, the coach or trainer can disable the flashing indicator light by simultaneously depressing a button on the player module and a button on the sideline module. This provides positive confirmation that the player who sustained the reported impact is in fact the player being evaluated by the coach or trainer.

Figure 8:
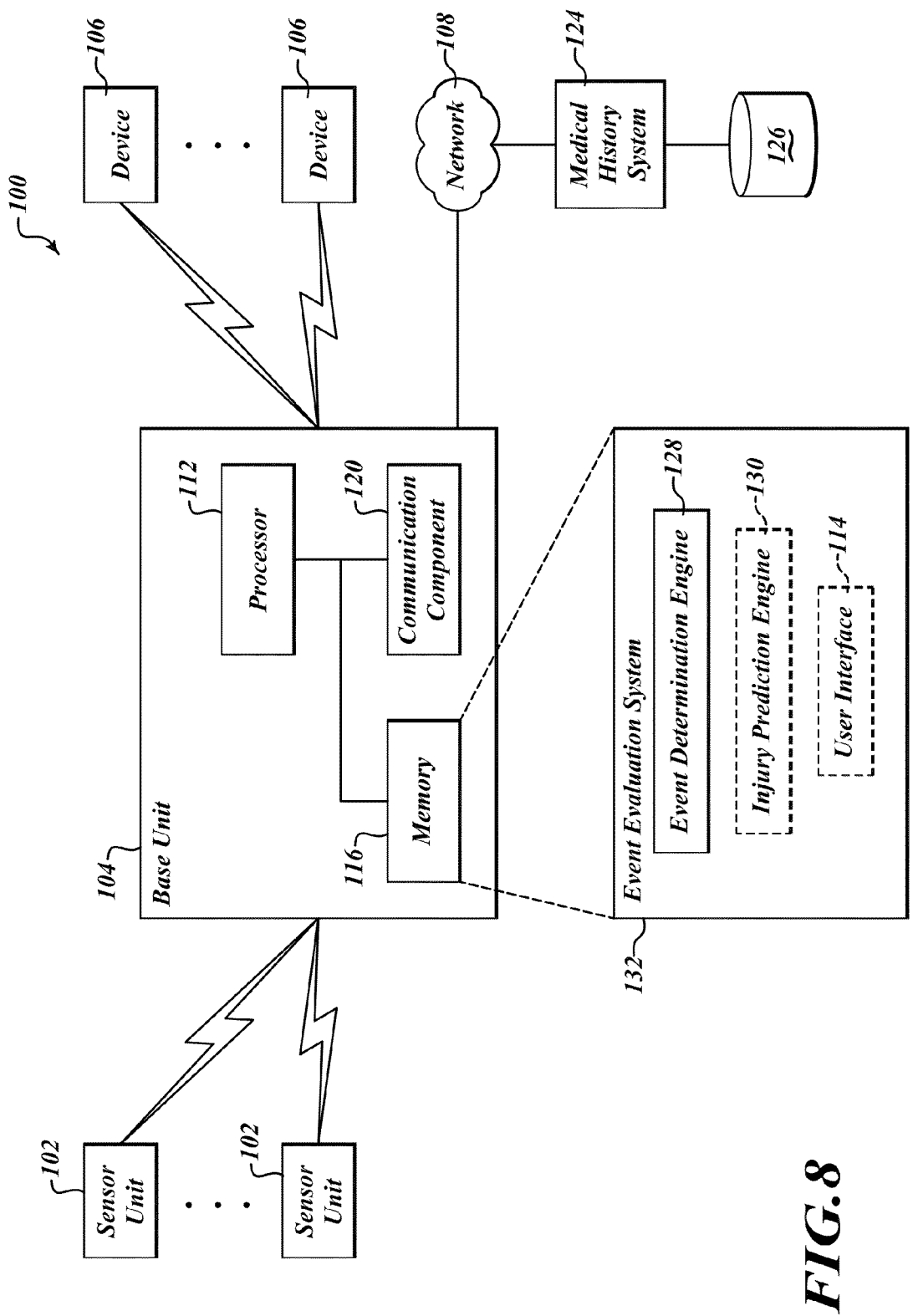
FIG. 8 illustrates an exemplary system formed in accordance with an embodiment of the present invention.

FIG. 8 illustrates an exemplary system 100 that performs aggregation of head-acceleration information received from a plurality of sensor units 102 and makes the acceleration information available to relevant parties. The sensor units are the mouth guards or other components as described above that incorporate one or more sensors. The system 100 includes a base unit 104 that is in wireless communication with one or more sensor units 102 and is optionally in wired or wireless communication with one or more devices 106. As described above, the sensor units may be directly coupled to the base unit, or may alternatively pass their data to the base unit indirectly, through a server, network, or other electronic device. The base unit 104 includes a processor 112, a user interface 114, local memory 116, and a communication component 120. The base unit 104 receives acceleration information wirelessly from each of the sensor units 102 and optionally makes that data available to the one or more additional devices 106.

In some versions, the base unit 104 or any of the devices 106 are in wired or wireless connection with a medical system 124 over a public or private data network 108. The medical system 124 receives acceleration, identification or other information from the base unit 104 or the devices 106 for analysis with regard to stored athlete information and/or storage into a database 126.

In one embodiment, the sensor units 102 include one or more accelerometers or gyros embedded into a device worn on or inside the athlete's head. When a sensor unit 102 has determined that an acceleration or rotational event has exceeded a predefined threshold, the sensor unit 102 transmits identification information of the individual sensor unit and recorded acceleration information associated with the acceleration event that exceeded the threshold.

In one embodiment, the communication component 120 of the base unit 104 receives the sensor information from the sensor unit 102 and delivers it to the processor 112. The processor 112 performs a number of optional operations, such as storing the received sensor information into the memory 116, activating an example event evaluation system 132 to analyze the sensor information stored in the memory 116, and/or sends processed or unprocessed sensor information to one or more of the devices 106 or the medical system 124 via the network 108. In one embodiment, the base unit 104 may simply be a wireless router device that would only include maybe just a communication component and a simple router processor.

Figure 13:
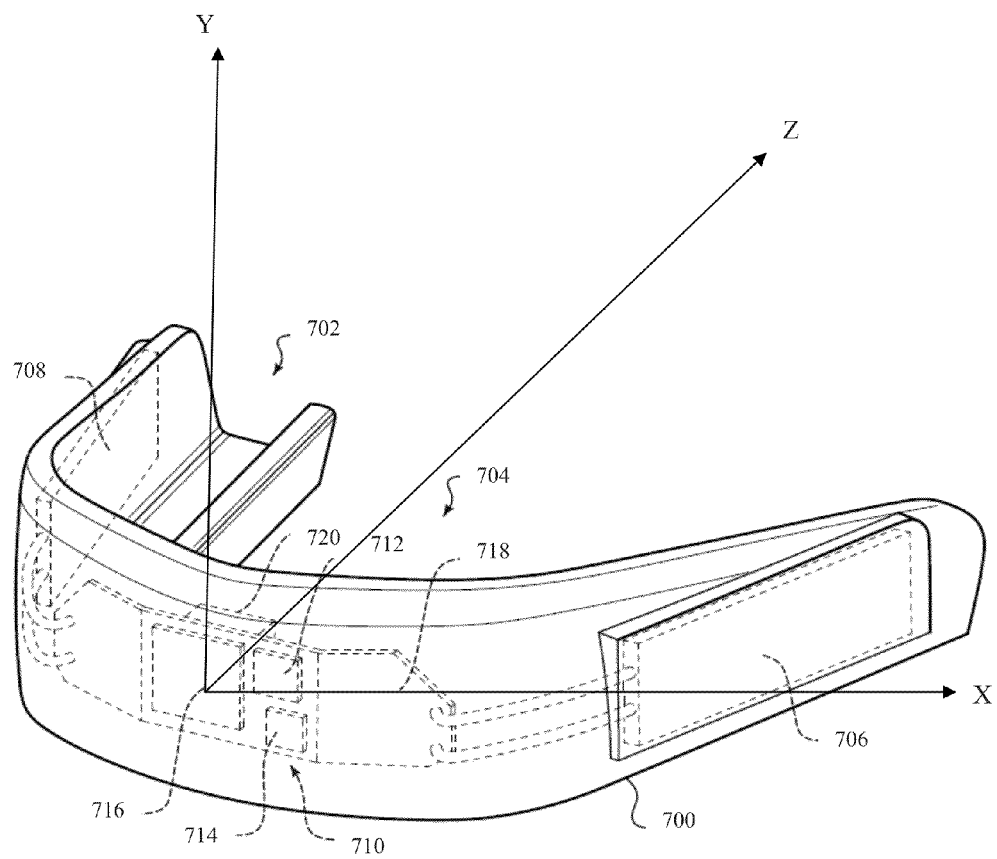
FIG. 13 is a perspective view of a preferred mouth guard with sensors.

As best seen in FIG. 13, the mouth guard may include a first battery 706 and a second battery 708. The batteries 706, 708 are electrically connected to a sensing module 710 and may be recharged with a wireless battery charger in some embodiments. In an example embodiment, the sensing module 710 is located at a front portion of the mouth guard 400 that covers the incisors of a user when the mouth guard 700 is inserted. However, the sensing module 710 may be located in a different area of the mouth guard in other embodiments. The sensing module 710 includes a three axis accelerometer 712 that senses acceleration along three orthogonal linear axes, a three axis gyroscope 714, and an electronics module 716 that are attached to a flex-printed circuit 718 (FPC) in an example embodiment. The accelerometer 712 preferably senses accelerations of at least 90 g and the gyroscope is preferably sensitive to at least 6000 degrees per second. In a preferred version, the electronic components described above are all positioned along an outer portion of the mouth guard where they will be located outside the teeth of the user and encapsulated within the material forming the mouth guard.

In accordance with preferred implementations of the invention, the accelerometer and gyroscope sense attributes of the environment of the mouth guard or other sensor unit 102 to determine a rate of acceleration of the sensor unit and an orientation of the sensor unit over time. Thus, by matching the acceleration and the position, the sensor unit is able to determine not only the fact of an event causing acceleration of a particular magnitude, but also a direction of the acceleration based on the direction of movement of the sensor unit. These data can be coupled, either in the sensor unit, the base unit, or another device, to calculate a vector representative of a combined direction and magnitude of the acceleration experienced by the sensor unit. In some instances the sensed event may be determined to be a straight line vector, while in other instances the motion of the sensor unit may be along an arc or otherwise rotational.

Although the sensing module 410 includes the three axis accelerometer 412 and the three axis gyroscope 414 in this embodiment, other sensor combinations may be used in other embodiments. For example, a two axis gyroscope in combination with a single axis gyroscope may be used rather than a three axis gyroscope, or additional linear accelerometers may be used rather than a gyroscope. In accordance with preferred implementations of the invention, however, the sensing module includes components that are capable of sensing both acceleration and position of the sensor unit.

The devices 106 may be one of a dummy display that includes a communication component for communicating with the base unit 104 or may be a smart computing device that includes a processor, a display and a user interface, such as a computing tablet device, a personal data assistant (PDA), a watch or any comparable device. The device 106 may also include local memory. The event evaluation system 132 may optionally be located in the local memory of the device 106. The device 106 would process, using event evaluation system 132, the sensor information received from the sensor units 102 via the base unit 104. Typical users of the devices 106 might be a team coach, trainer or local medical professional.

An example event evaluation system 132 includes an event determination system 128 that receives sensor information and creates a model of the event. To create a model, an example event determination system 128 translates linear and/or rotational forces from the location of a sensor unit 102 to a center of mass of an athlete's head. The model optionally displays the linear and/or rotational forces on the athletes head. The example event evaluation system 132 also optionally includes an injury prediction engine 130. The injury prediction engine 130 is optionally predicts an injury to the athlete by comparing the received sensor information to sensor information stored within the medical system 124. When the injury prediction engine 130 discovers similar sensor information in the medical system 124, then the injury prediction engine 130 uses the medical diagnosis of the similar sensor information in the medical system 124 to predict an injury to the athlete. The event evaluation system 132 includes a user interface 114 to display event and injury prediction information.

Example embodiments described herein provide applications, tools, data structures and other support to implement an event evaluation system 132 to be used for near real time collection of data. Other embodiments of the described techniques may be used for other purposes. In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the code flow, different code flows, etc. Thus, the scope of the techniques and/or functions described are not limited by the particular order, selection, or decomposition of steps described with reference to any particular routine.

Figure 9:
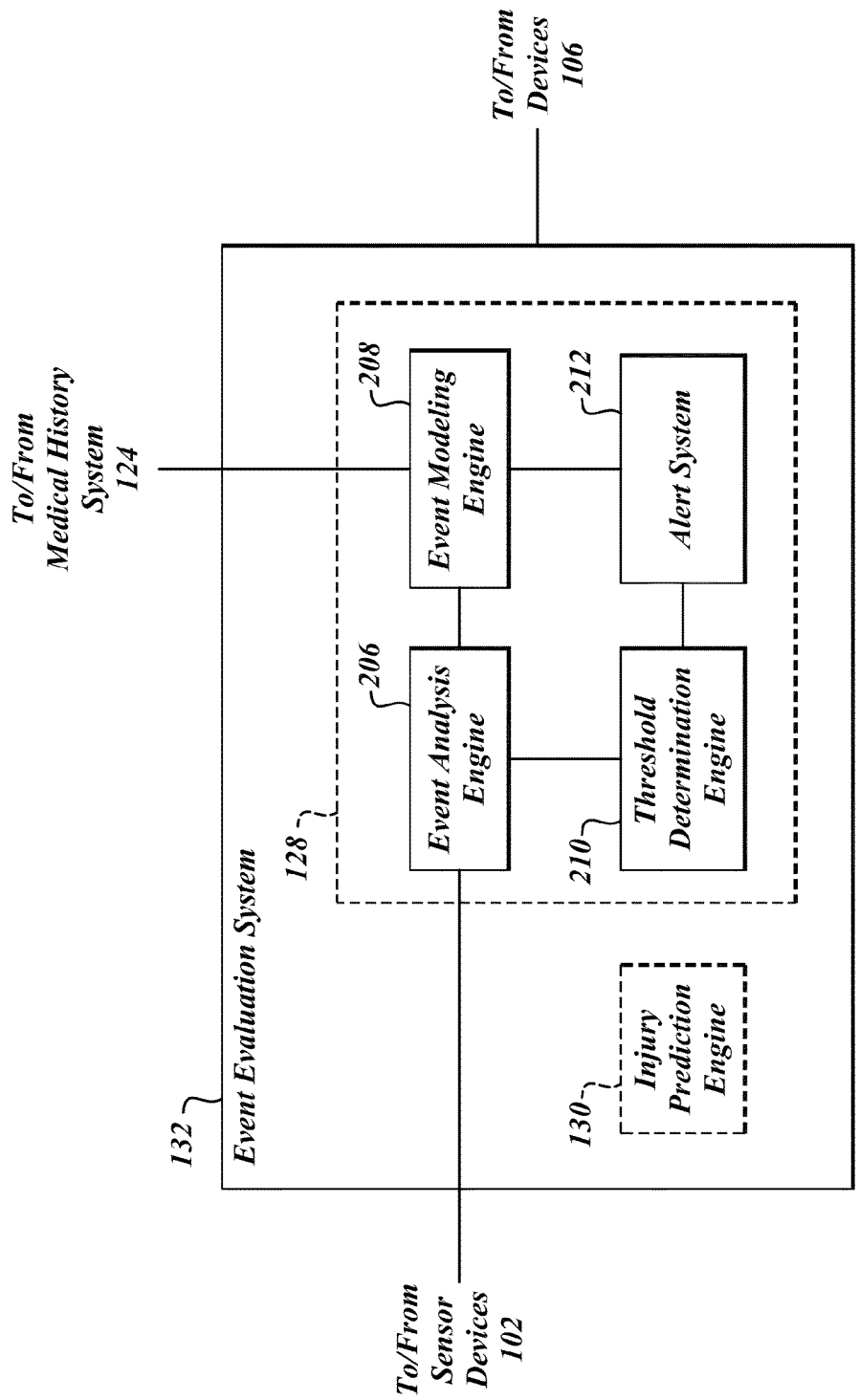
FIG. 9 is an example block diagram of example components of an event evaluation system.

FIG. 9 is an example block diagram of example components of an event evaluation system. In one embodiment, the event evaluation system 132 includes one or more functional components/modules that work together to process received sensor information. These components may be implemented in software or hardware or both. The event evaluation system 132 includes an event determination system 128 and an injury prediction engine 130 as mentioned with respect to FIG. 8.

The event determination system 128 includes an event analysis engine 206, an event modeling engine 208, a threshold determination engine 210 and an alert system 212. The event analysis engine 206 is configured to receive sensor information from sensor devices 202 in the form of an indication of acceleration and/or rotational information from an event to be analyzed and an indication of the player that experienced the event. The event analysis engine 206 is configured to determine magnitudes and/or vectors of forcers/impacts experienced by the player. A magnitude may be determined based on a reading from a sensor or the magnitude may be recreated by measuring, for example, the length of time a force was above a threshold value and/or mathematically estimating the magnitude of the force. In one embodiment the force is analyzed by matching a graphical representation of the force to a known pattern. In yet another embodiment, a graphical representation of the force is analyzed for its peak value, it area under the curve and/or its rate of change. The event analysis engine 206 preferably provides processed sensor information in the form and magnitude and/or vector information to the event modeling engine 208 and the threshold determination engine 210.

The event modeling engine 208 is configured to receive processed sensor information and to create a model of the sensor information on a human form. For example, the event modeling engine 208 creates a vector of impact and a rotational arc on a model skull to display the effect of an event on a players head. The event modeling engine 208 determines the location, with reference to the body, of the sensor unit that transmitted the sensor information. The event modeling engine 208 optionally determines the location of the sensor units 102, with reference to the body, by accessing configuration information stored in the memory 116 of the base station 104 described in FIG. 8, receives sensor location with the sensor information, and/or receives an indication of a sensor location through a user interface such as the user interface 114 described with respect to FIG. 8. The event modeling engine 208 uses the sensor location information and general characteristics of a human head to model the forces that the head experienced. In one embodiment, the actual dimensions of a player's human head are known. The event modeling engine 208 also adjusts the sensor information using one or more algorithms based on the location of the sensor on the player. The event modeling engine 208 transmits the event data to a medical history system 126 to be used in future events and to a mobile device 214 for display.

A preferred manner for modeling the event is further illustrated with reference to FIGS. 13 and 14. As best seen in FIG. 13, a mouth guard or other sensor unit is configured with an expected orientation with respect to the athlete's skull. In the case of a mouth guard, where the teeth are in a fixed position, a set of X-Y-Z axes are established on the mouth guard as shown. In the illustrated version, the mouth guard is configured to be worn on a set of upper teeth, establishing the convention of the axes accordingly. In other examples, such as sensors incorporated into goggles or headbands, a similar convention is employed based on where the sensors are to be located in use.

Figure 14:
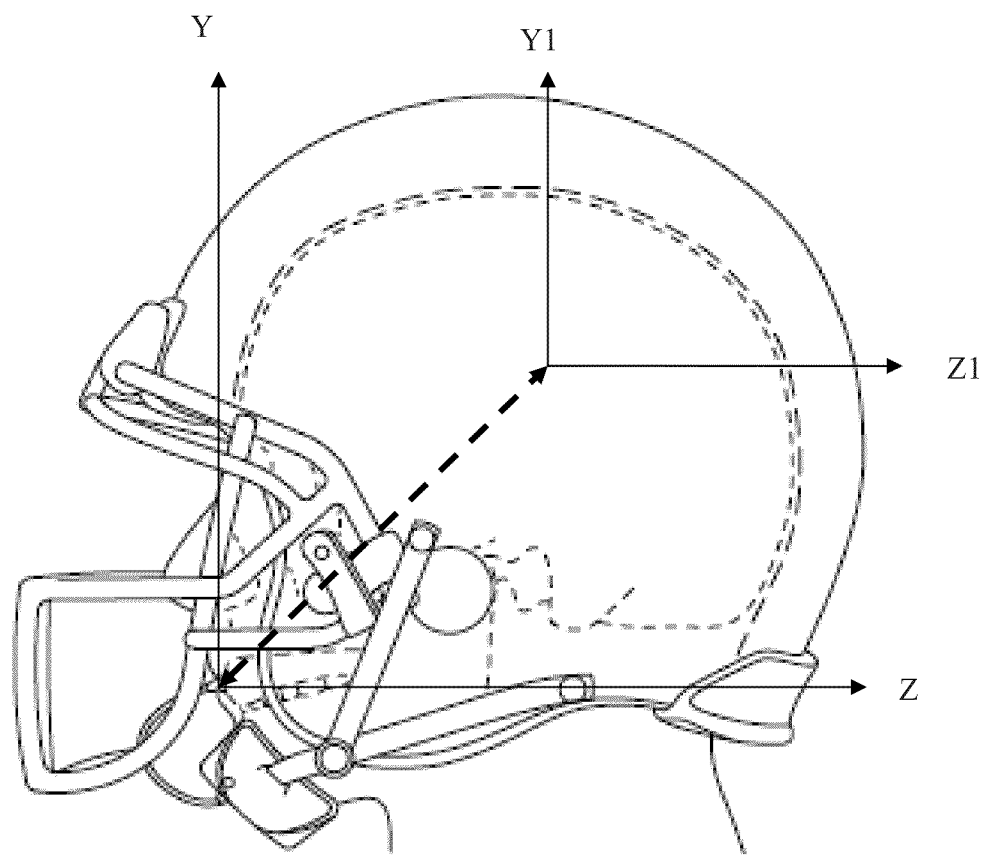
FIG. 14 is a plan view of a translation of forces experienced by a user's mouth guard to the user's brain.

As seen in FIG. 14, the location and convention of the axes with respect to the mouth guard may be translated to a corresponding set of axes having an origin at the center of mass of a user's brain. In other versions, the translation of the axes may be with respect to an origin at any other desired location. Thus, as shown in FIG. 14, the XYZ axes (with the X axis not visible in the plan view, but which extends orthogonal to the illustration) are translated positionally to new axes X1Y1Z1 (again, with the X1 axis not visible). The distance and angle of the translation maybe generalized for typical athletes, or may be tailored for each athlete individually using measurements of the user's head or other data such as an MRI or other such scan.

Based on the positional translation, the acceleration and positional orientation information as detected by the accelerometer, gyroscope, or other sensors can be translated to determine a corresponding vector experienced with respect to the new origin at the center of the brain. Accordingly, each sensed event can be presented in terms of the acceleration and rotational movement experienced with respect to the axes X1Y1Z1 having an origin at the center of the brain.

The threshold determination engine 210 is configured to compare the received processed sensor information to a threshold value and optionally activate an alert system 212. The threshold determination engine 210 uses a magnitude, an area under a graphical representation of the sensor information, a rate of change and/or a number of total events above threshold to activate the alarm system 212. The threshold used by the threshold determination engine may be a default setting, a user setting, and/or a setting that is dynamically set in conjunction the injury prediction engine 209 and the medical history system 126. The alert system 212 is configured to send an alert to a mobile device 214, or optionally sound an audible alarm or active a visual indicator such as the LED described above.

Figure 15:
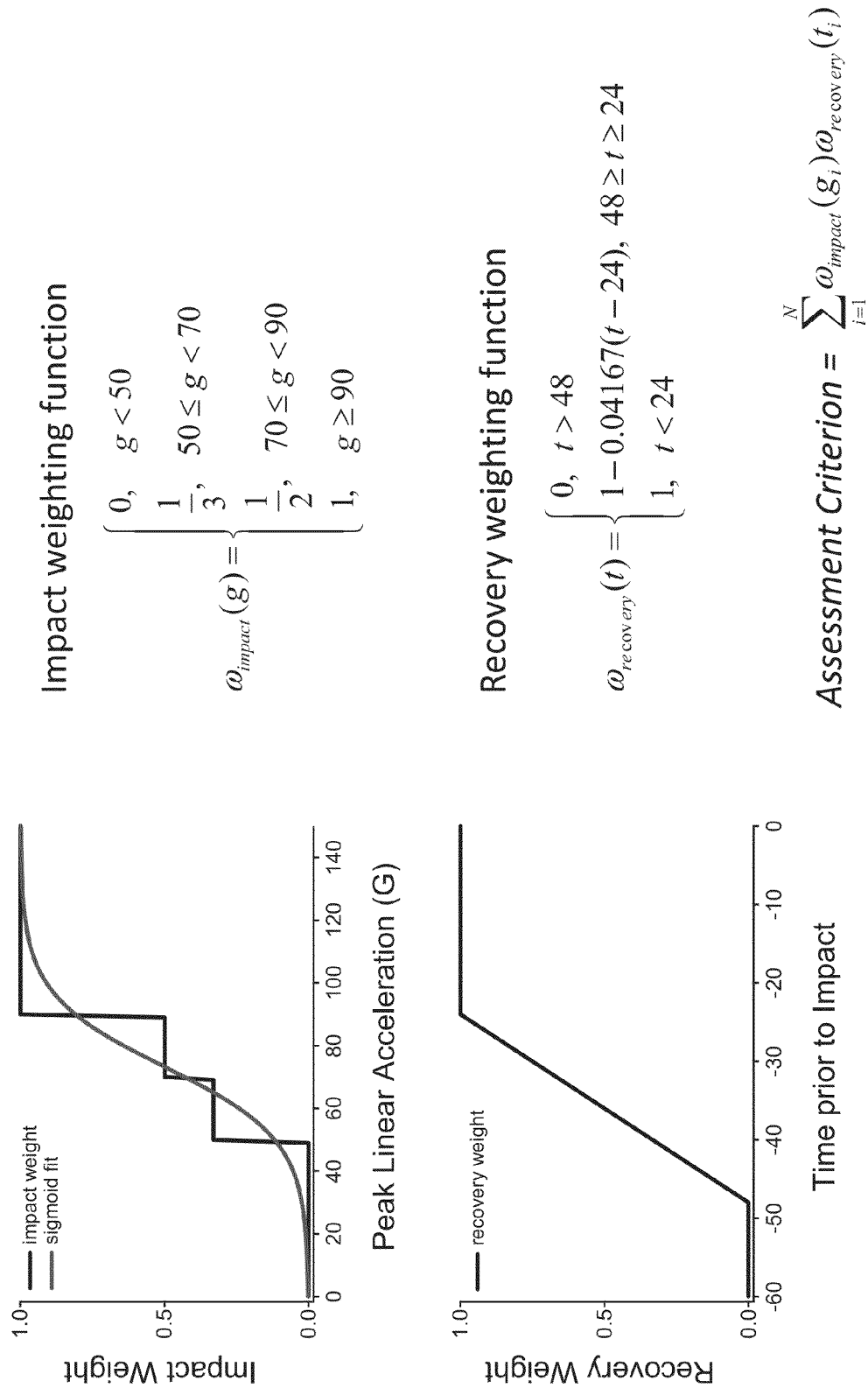
FIG. 15 illustrates recovery weights and impact weights for evaluating impacts.

With reference to FIG. 15, a preferred version of the invention calculates an assessment criterion score as a function of the magnitude of the impact and recovery time since prior impacts. The magnitude of the impact is preferably a weighted impact score, providing a normalized weight (that is, a score from zero to one) based on the magnitude of the impact. Where the impact is measured in linear peak acceleration (g), a weighted score of 0 is provided for impacts of less than 50 g; a score of ⅓ is provided for impacts between 50 g and 70 g; a score of ½ is provided for impacts between 70 g and 90 g; and a score of 1 is provided for impacts above 90 g. As shown in FIG. 15, the weighted function may be a discrete stepped score, or may alternatively be a best fit curve to provide a having any value on the best fit line between 0 and 1.

After a user experiences impacts producing scores above zero, the user will recover from those impacts over time. Consequently, a preferred version of the invention further produces a recovery weighting score. The recovery weighting is zero for events more than 48 hours old and is 1 for events less than 24 hours old. Between 24 and 48 hours, a preferred version of the invention assumes a linear recovery score and assigns a weight of 1-0.04167(t-24), where t is the time in hours since the event.

An overall assessment criterion score is produced by summing the weighted impact times the recovery weight for each experienced event. In various versions of the invention, a display may optionally show the score itself or a color or other indicator of the magnitude of the score.

Figure 10:
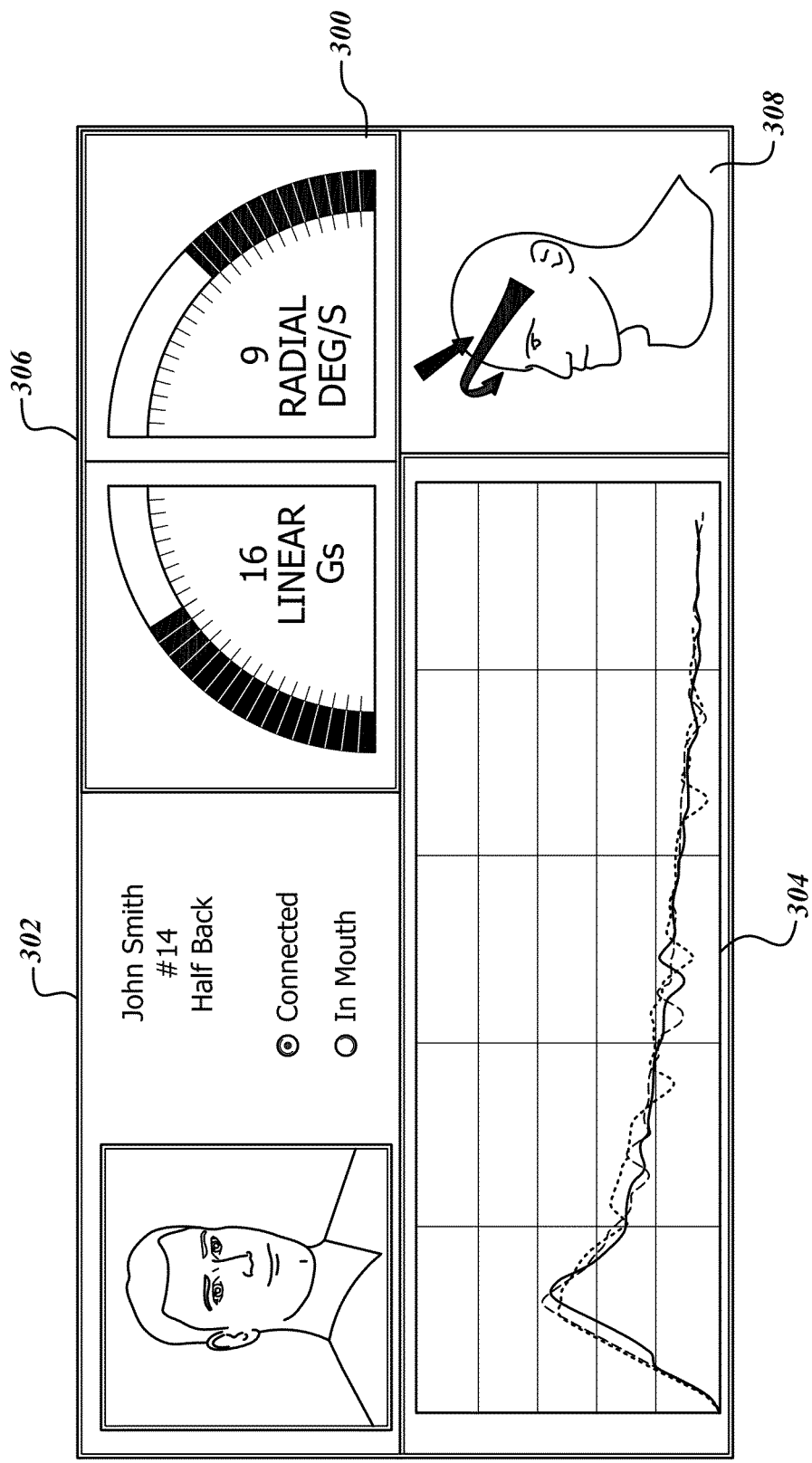
FIG. 10 is an example screen display illustrating aspects of an event evaluation system.

FIG. 10 is an example screen display illustrating aspects of an event evaluation system. FIG. 10 depicts a user interface 300 that is an interface for interacting with an event evaluation system, such as the event evaluation system 132 of FIG. 9. The interface 300 includes a graphical representation of sensor data, such as acceleration data shown in a screen area 304. Screen area 304 is located in the bottom left corner of the screen, however in alternate embodiments may be located elsewhere on the screen or shown in response to selection of a button (not shown) by a user.

The interface 300 includes an indication of a player, and optionally contains his/her number and if the system is connected in a screen area 302. The system connected indication includes an indication of connection of the player's sensor device to the system and an indication of the presence of a sensor device in the mouth of the player. Screen area 302 optionally may be used to indicate to a coach, trainer or a parent that a player's data is not being received by the system. Screen area 302 is located above screen area 304 and shares a top half of the user interface 300 with screen area 306.

A magnitude of the most recent sensor information is shown in a screen area 306. The magnitude is optionally shown in the form of a dial, but also may include numbers or other indicating methods. The indication of screen area 306 is configured to quickly display to a coach, trainer, or health care provider the magnitude of the most recent impact.

In the preferred implementation, the sensor unit such as the mouth guard transmits acceleration and orientation data to the base unit or other such computer on the sidelines. The base unit receives the acceleration and orientation data and is thereby able to present the acceleration data (shown as a number of linear g's in FIG. 10) and the rotational movement (shown as a number of radial degrees in FIG. 10). The radial movement is calculated as a function of the orientation change over time. As described above, the acceleration and rotational information may be optionally presented as the data experienced by the mouth guard (or other sensor) or can be presented as translated data with respect to the shifted origin at the center of the brain.

A model of the most recent sensor information on a human form is shown in a model area 308. The model area 308 is located in the bottom right corner of the user interface 300. The model includes a rotatable human skull that contains an indication in the form of an area of a vector of impact and an arrow indicating a rotational path of the head. The interface 300 is used to show information to a coach, trainer, caregiver, or health care provider relating to the most recent event. The interface 300 may be used as a tool to determine whether a player has suffered an injury.

Figure 11:
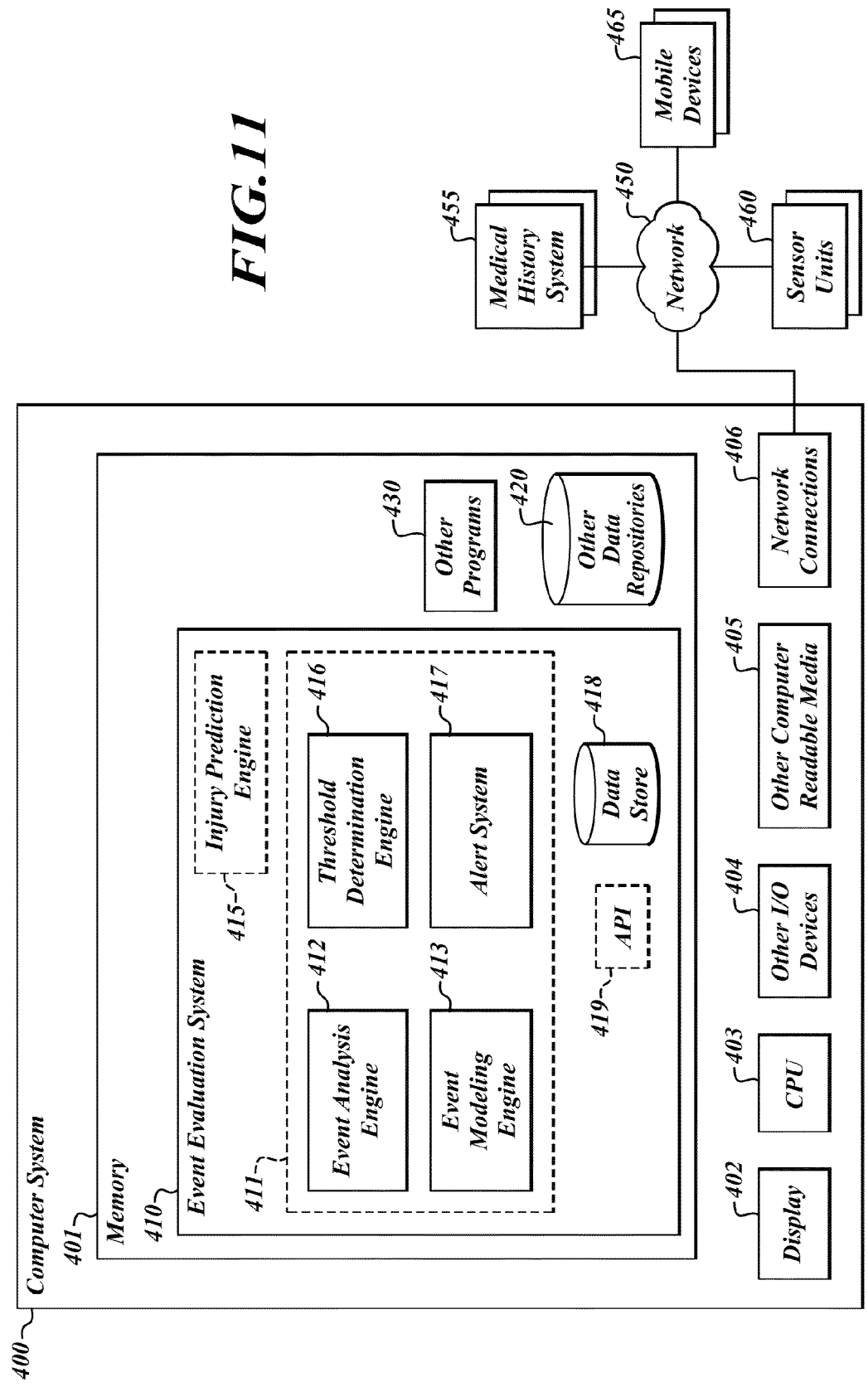
FIG. 11 is an example block diagram of an example computing device for practicing embodiments of an event evaluation system.

FIG. 11 is an example block diagram of an example computing device for practicing embodiments of an event evaluation system. In particular, FIG. 11 shows a computing system 400 that may be utilized to implement an event evaluation system 410. Note that one or more general purpose or special purpose computing systems/devices may be used to implement the event evaluation system 410. In addition, the computing system 400 may comprise one or more distinct computing systems/devices and may span distributed locations. Furthermore, each block shown may represent one or more such blocks as appropriate to a specific embodiment or may be combined with other blocks. Also, the event evaluation system 410 may be implemented in software, hardware, firmware, or in some combination to achieve the capabilities described herein.

In the embodiment shown, computing system 400 comprises a computer memory ("memory") 401, a display 402, one or more Central Processing Units ("CPU") 403, Input/Output devices 404 (e.g., keyboard, mouse, CRT or LCD display, and the like), other computer-readable media 405, and network connections 406. The event evaluation system 410 is shown residing in memory 401. In other embodiments, some portion of the contents, some or all of the components of the event evaluation system 410 may be stored on and/or transmitted over the other computer-readable media 405. The components of the event evaluation system 410 preferably execute on one or more CPUs 403 and extract and provide quotations, as described herein. Other code or programs 430 (e.g., an administrative interface, a Web server, and the like) and potentially other data repositories, such as data repository 420, also reside in the memory 401, and preferably execute on one or more CPUs 403. Of note, one or more of the components in FIG. 11 may not be present in any specific implementation. For example, some embodiments may not provide other computer readable media 405 or a display 402.

In a typical embodiment, as described above, the event evaluation system 410 includes an event determination system 411 and an injury prediction engine 415. The event determination system 411 includes an event analysis engine 412, an event modeling engine 413, a threshold determination engine 416 and an alert system 417. The event determination system 411 performs functions such as those described with reference to the event determination system 200 of FIG. 9. For example, the event determination system 411 receives sensor information and/or sensor data from sensor units 460 and transforms the sensor information into a model that displays a recreation of an impact on a human head.

The event evaluation system 410 interacts via the network 450 with (1) a medical history system 455, (2) mobile devices 465 and/or (3) sensor units 460. The network 40 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The mobile devices 465 include desktop computing systems, notebook computers, mobile phones, smart phones, personal digital assistants, and the like.

In an example embodiment, components/modules of the event evaluation system 410 are implemented using standard programming techniques. For example, the Event evaluation system 410 may be implemented as a "native" executable running on the CPU 403, along with one or more static or dynamic libraries. In other embodiments, the Event evaluation system 410 may be implemented as instructions processed by a virtual machine that executes as one of the other programs 403. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the event evaluation system 410, such as in the API 419, can be made available by standard mechanisms such as through C, C++, C#, and Java APIs; libraries for accessing files, databases, or other data repositories; through languages such as XML; or through Web servers, FTP servers, or other types of servers providing access to stored data. The data store 418 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the event evaluation system 410 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 12:
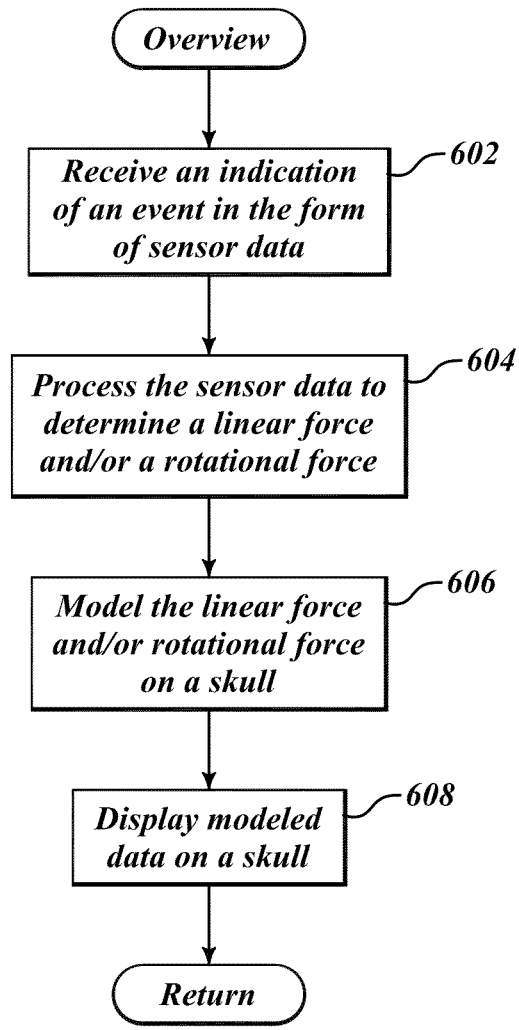
FIG. 12 is an example flow diagram of example components of an event evaluation system.

FIG. 12 is an example flow diagram of example components of an event evaluation system. FIG. 12 illustrates an overview of the operation of an event evaluation system such as the event evaluation system 200 shown with reference to FIG. 9. At block 602 the event evaluation system receives an indication of an event in the form of sensor data and/or sensor information. Generally when an event occurs sensor data is either transmitted from the sensor device wirelessly or is later downloaded through a wired connection. In one embodiment, a visual indicator on a mouth guard could be used to prompt a player to transmit sensor data to the event evaluation system. The received data may be received from a number of sources such as MEMS type impact sensors, MEMS accelerometers, and miniature weighted cantilevers fitted with miniature strain-gauge elements, piezoelectric membranes, or Force-Sensitive-Resistors (FSR). At block 604 the sensor data is processed to determine a linear force and/or a rotational force. The sensor data may be processed and normalized in this block. The received data is processed to determine forces information, such as for example, a peak force, a rate of change of the force, and an area under the graphical representation of the force may be used to determine magnitude or a characteristic of the force. In this block acceleration and rotational forces may be extrapolated from the received data if not included in the sensor data.

At block 606, using the processed sensor data, the event evaluation system is configured to provide a model of the forces on a human skull. Using a location of the sensor that sensed the event, the process translates the sensor data to a center of mass of the human skull, thus allowing for a model to be built, showing the effect of the impact on the skull. In some cases the data will be algorithmically altered based on the location of the sensor.

At block 608, the modeled data is displayed. The model data can be overlaid onto a model human skull, or the data can be used to recreate the impact in the form of a video or a series of stills showing the event at different time intervals. After block 608 the process ends.

Although the techniques of the event evaluation system are generally applicable to any type of sensor data related to a head impact, the concepts and techniques described here are applicable to other types of sensor data to include sensors on other parts of the body and to sensors on other devices like vehicles. Essentially, the concepts and techniques described are applicable to any sensor collection environment. For example in detecting and processing an explosive charge and modeling its effects on a body or during a car accident to predict injuries to a body. Also, although certain terms are used primarily herein, other terms could be used interchangeably to yield equivalent embodiments and examples. In addition, terms may have alternate spellings which may or may not be explicitly mentioned, and all such variations of terms are intended to be included.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A computer implemented method for event detection comprising:
    collecting sensor data detected by a sensor attached to a head of a user, the sensor monitoring an impact parameter associated with an impact event;
    determining a time since the impact event;
    calculating an assessment score as a function of the impact parameter and the time since the impact event;
    determining an impact vector as a function of the impact parameter associated with the impact event;
    wherein the step of determining at least one impact vector further comprises translating the impact vector from a location of the sensor to an associated vector experienced by at least one other location in the head of the user.

2. The method of claim 1, wherein the impact event comprises a plurality of impact events and further wherein the step of calculating comprises determining an assessment score for each one of the plurality of events and summing the plurality of assessment scores to produce a total assessment score.

3. The method of claim 1, wherein determining the impact vector further comprises associating the impact vector with a center of mass of a brain of the user.

4. The method of claim 1, wherein determining an impact vector comprises determining a direction and magnitude of rotation of the head of the user as a function of the impact event.

5. The method of claim 1, further comprising providing an alert when the assessment score is above an assessment threshold.

6. The method of claim 1, wherein providing an alert comprises at least one of an audible or visual signal.

7. A system configured to analyze impact event data, comprising:

a sensor configured to be worn on a head of a user, the sensor being capable of sensing an impact parameter;

a computer processor; and a memory in communication with the processor and the sensor, the memory containing stored programming instructions operable by the processor to:

receive impact parameter information related to the sensed impact parameter; and calculate an assessment score as function of the impact parameter information and the time since the impact event;

wherein the programming instructions further cause the processor to determine an impact vector as a function of the impact parameter associated with the impact event, the processor further translating the impact vector from a location of the sensor to an associated vector experienced by at least one other location in the head of the user.

8. The system of claim 7, wherein the impact event comprises a plurality of impact events, and further wherein a total assessment score is a sum of the assessment score for each one of the plurality of impact events.

9. The system of claim 7, wherein the assessment score is multiplied by a weight related to the time since the impact event, the weigh equaling zero when the time is more than 48 hours, the weight equaling one when the time is less than 24 hours, and the weight equaling 1-0.04167(time-24) when the time is between 24 and 48 hours.

10. The system of claim 9, wherein the assessment score equals the weight times an impact score, the impact score equaling 0 when the impact parameter information is less than 50 g, the impact score equaling ⅓ when the impact parameter information is greater than or equal to 50 g but less than 70 g, the impact score equaling ½ when the impact parameter information is greater than or equal 70 g but less than 90 g, and the impact score equaling 1 when the impact parameter information is greater than or equal to 90 g.

11. The system of claim 10, further comprising a display, the display configured to present an indicator related to the assessment score.

12. The system of claim 7, wherein the programming instructions further cause the processor to determine an impact vector as a function of the impact parameter associated with the impact event.

13. The system of claim 12, wherein the impact vector is associated with a center of mass of a brain of the user.

14. The system of claim 7, wherein the programming instructions further cause the processor to determine a rotational direction and magnitude of the impact event as a function of the impact parameter information.

15. The system of claim 14, further comprises a display, the display presenting a graphical depiction of the rotation direction and magnitude of the impact event.

16. The system of claim 7, further comprising a user interface, the processor causing the user interface to provide an alert when the assessment score is above an assessment threshold.

17. The system of claim 7, wherein providing an alert comprises at least one of an audible or visual signal.

* * * * *